United States Patent
Ziemer et al.

[11] Patent Number: 5,910,195
[45] Date of Patent: Jun. 8, 1999

[54] BEARING SPACER AND CRANKSHAFT SEAL FOR END CAP ASSEMBLY OF AIR COMPRESSOR

[75] Inventors: Lance W. Ziemer, Oakfield; Kenneth W. Kujawski, Allenton, both of Wis.

[73] Assignee: Brunswick Corporation, Lake Forest, Ill.

[21] Appl. No.: 08/862,733

[22] Filed: May 23, 1997

[51] Int. Cl.⁶ .................................................. F16C 3/04
[52] U.S. Cl. ........................ 74/603; 74/595; 74/596; 384/484
[58] Field of Search ........................ 74/595–606 R; 384/484

[56] References Cited

U.S. PATENT DOCUMENTS

| | | | |
|---|---|---|---|
| 2,519,501 | 8/1950 | Redman | 74/595 |
| 3,827,314 | 8/1974 | Steele | 74/606 R |
| 3,938,864 | 2/1976 | Haussels | 308/187.2 |
| 4,339,161 | 7/1982 | May | 308/187.1 |
| 4,366,995 | 1/1983 | Kocian | 308/26 |
| 4,940,340 | 7/1990 | Durham | 384/482 |
| 5,020,606 | 6/1991 | Odor et al. | 173/163 |
| 5,028,054 | 7/1991 | Peach | 384/480 |
| 5,058,485 | 10/1991 | Cardillo | 91/485 |
| 5,209,194 | 5/1993 | Adachi et al. | 74/568 R X |
| 5,332,368 | 7/1994 | Macier et al. | |
| 5,373,603 | 12/1994 | Stegens | 384/489 X |

Primary Examiner—Vinh T. Luong
Attorney, Agent, or Firm—Andrus, Sceales, Starke & Sawall

[57] ABSTRACT

An end cap assembly for an air compressor driven by an internal combustion engine has a crankshaft structure provided with a shaft, an end cap disposed around the shaft, a first set of ball bearings mounted in the end cap for disposition around the shaft and a second set of ball bearings mounted in the end cap and spaced from the first set of ball bearings for disposition around the shaft. A crankshaft seal and bearing spacer arrangement is disposed around the shaft between the first and second sets of ball bearings for blocking passage of air and oil from the engine, and preventing the first and second sets of ball bearings from contacting each other.

11 Claims, 1 Drawing Sheet

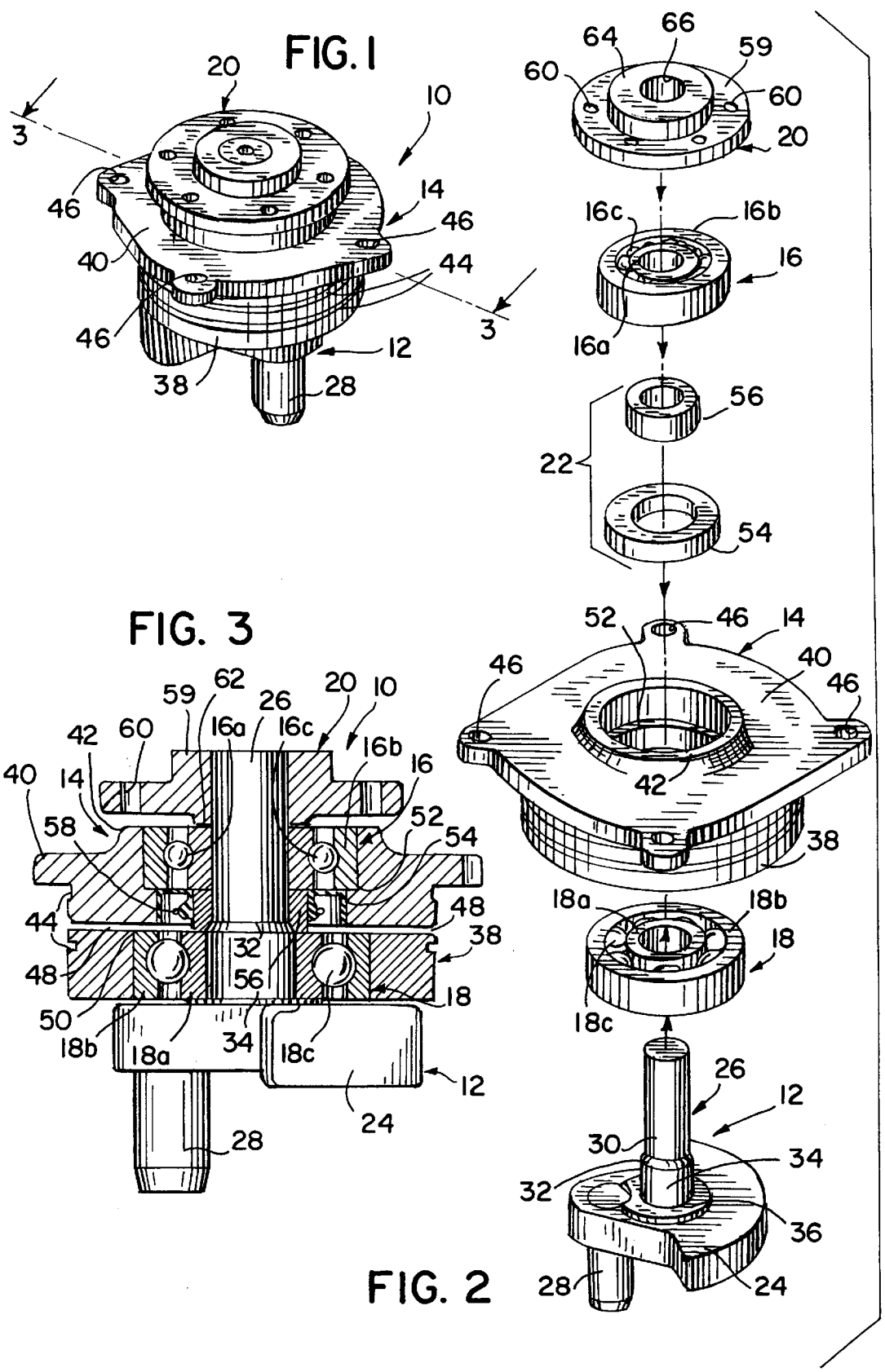

BEARING SPACER AND CRANKSHAFT SEAL FOR END CAP ASSEMBLY OF AIR COMPRESSOR

BACKGROUND OF THE INVENTION

This invention relates broadly to a mechanically driven air compressor adapted for use in fuel injection systems for internal combustion engines, and more particularly, pertains to an air compressor having an end cap assembly in which a crankshaft is rotated by an engine driven pulley.

It is well known that an air compressor is used to force fuel into the combustion chamber of a fuel injected internal combustion engine. The air compressor is typically driven by the internal combustion engine via a drive belt which rotates a drive pulley. The drive pulley is connected to an end cap assembly including a rotatable crankshaft structure having a upwardly extending main shaft supported by a set of upper and lower ball bearings, and a downwardly depending crankpin which is joined to a reciprocated piston via a connecting rod. The piston moves back and forth in a cylinder bore having inlets for admitting air and the piston compresses the air which is forced through a reed valve mechanism into an outlet. This outlet communicates with an air pressure control device, such as an air pressure regulating valve, for providing a constant desired outlet pressure, typically 80 psi. Excessive air is dumped into an exhaust system. Such disclosure is generally set forth in U.S. Pat. No. 5,332,368 issued Jul. 26, 1994.

Such air compressors are particularly useful for fuel injection systems used in conjunction with two-cycle internal combustion engines such as used in marine applications and the like generating substantial horsepower for their relatively small size. In such applications, the air compressor must be able to provide high pressure with the engine operating at various speeds including full throttle, or typically 6000 RPM.

Unfortunately, most air compressors currently available are designed to operate in the 2000–2500 RPM range and, when driven by an engine at full throttle, will allow severe leakage or blowby of air and oil from the crankcase past the ball bearings in the end cap assembly. A further problem occurs in the assembly of prior art air compressors where the internal structure of the end cap assembly permits the ball bearings to be pressed together or preloaded in a manner which can adversely affect the operation of the air compressor.

Accordingly, it is desirable to provide an air compressor which may be operated reliably at high speeds without serious leakage of air or oil from the crankcase past the ball bearings of the end cap assembly. It is also desirable to provide an air compressor in which the lifetime of the ball bearings of the end cap assembly is extended by preventing preloading of the bearings during assembly operations.

BRIEF SUMMARY OF THE INVENTION

The present invention advantageously provides an air compressor for an internal combustion engine wherein an end cap construction provides ease of assembly, sealing of the crankcase, and improved bearing life with reduced costs and improved reliability.

In one aspect of the invention, there is contemplated an end cap assembly for an air compressor including a crankshaft structure having a shaft, and an end cap disposed around the shaft. An upper set of ball bearings is mounted in the end cap for disposition about the shaft. A lower set of ball bearings is mounted in the end cap and spaced below the upper set of ball bearings for disposition about the shaft. A seal and spacer arrangement is positioned about the shaft between the upper set of ball bearings and the lower set of ball bearings. The end cap assembly also includes a hub mounted above the upper set of ball bearings for disposition about the shaft. The seal and spacer arrangement includes a generally cylindrical ring surrounded by a reinforcing sealing member. Each of the upper and lower sets of ball bearings has a generally cylindrical inner race and a generally cylindrical outer race. The inner races of the upper and lower sets of ball bearings are separated by the seal and spacer arrangement, and the outer races of the upper and lower sets of ball bearings are separated by internal structure formed in the end cap. The outer diameter of the ring is smaller than the outer diameter of the inner race on both the upper and lower set of ball bearings. The height of the ring is less than the height of the inner races and the outer races of the upper and lower sets of ball bearings. The shaft has a radially flaring wall and an expanded portion having a height equal to the height of the inner race and the outer race of the lower set of ball bearings. The inner diameter of the ring is stepped in a linear portion equal to the inner diameter of the inner race of the upper set of ball bearings, and a diverging portion following the flaring wall of the shaft.

In another aspect of the invention, an end cap assembly for an air compressor has a crankshaft structure provided with a shaft, an end cap disposed around the shaft, a first set of ball bearings mounted in the end cap for disposition around the shaft and a second set of ball bearings mounted in the end cap and spaced from the first set of ball bearings for disposition around the shaft. The improvement resides in a crankshaft seal and bearing spacer arrangement disposed around the shaft between the first and second sets of ball bearings for blocking passage of air and oil, and preventing the first and second sets of ball bearings from contacting each other.

In yet another aspect of the invention, there is contemplated a method of forming an end cap assembly for an air compressor.

Various other objects, features and advantages of the invention will be made apparent from the following description taken together with the drawings.

BRIEF DESCRIPTION OF THE SEVERAL VIEWS OF THE DRAWINGS

The drawings illustrate the best mode presently contemplated of carrying out the invention. In the drawings:

FIG. 1 is a perspective view of an air compressor end cap assembly embodying the present invention;

FIG. 2 is an exploded view of the end cap assembly; and

FIG. 3 is a view of the end cap assembly shown mostly in cross-section taken along line 3—3 in FIG. 1.

DETAILED DESCRIPTION OF THE INVENTION

As an overview, the present invention relates to an air compressor which is typically driven by an internal combustion engine via a drive belt which drives a drive pulley. As more fully set forth in the Background of the Invention, the drive pulley is connected to an end cap assembly 10 forming a portion of the air compressor and embodying the present invention.

Referring now to FIGS. 1–3, the end cap assembly 10 comprises a crankshaft structure 12, an end cap 14, an upper set of ball bearing 16, a lower set of ball bearings 18, a hub 20 and a crankshaft seal and bearing spacer arrangement 22.

Crankshaft structure 12 includes a counterweight 24 provided with an upwardly projecting main shaft 26, and a downwardly depending crankpin 28 which is eccentrically mounted thereon. The shaft 26 has an upper portion 30 which is generally cylindrical except for a radially expanding or flaring wall 32, and a lower or expanded cylindrical portion 34 having a diameter slightly larger than the upper portion 30. The lower or expanded portion 34 rises from a thin circular shelf or platform 36 formed on the upper surface of the counterweight 24. Supported on the platform 36 is the bottom surface of the end cap 14 which has a generally cylindrical base 38 and includes a flanged top surface 40 formed with an ascending neck 42. The base 38 is formed with a pair of spaced annular grooves 44 and the top surface 40 is provided with a series of spaced holes 46 to facilitate assembly of the entire air compressor as will be explained hereafter. A pair of oil inlets 48 are positioned in the base 38 between the grooves 44 and extend inwardly into a three stepped cavity centrally formed in the end cap 14. A lower cavity step in the end cap 14 is defined by a first annular shoulder 50, an upper cavity step is defined by a second annular shoulder 52, and an intermediate cavity step is defined between the upper and lower cavity steps.

The upper set of ball bearings 16 includes an inner race 16a, an outer race 16b, and a set of balls 16c retained between races 16a, 16b. Similarly, the lower set of ball bearings 18 includes an inner race 18a, an outer race 18b, and a set of balls 18c retained between races 18a, 18b. The ball bearings 16 are mounted in the upper cavity step of the end cap 14 with the outer race 16b seated against the annular shoulder 52 and the inner race 16a disposed about the upper portion 30 of shaft 26. The ball bearings 18 are mounted in the lower cavity step of the end cap 14 with the outer race 18b seated against the annular shoulder 50 and the inner race 18a disposed about the expanded portion 34 of shaft 26. As seen in FIG. 3, the height of the expanded portion 34 is substantially equal to the height of the inner and outer races 18a, 18b.

In accordance with the invention, the crankshaft seal and bearing spacer arrangement 22 is positioned around the shaft 26 between the upper and lower sets of ball bearings 16, 18, respectively. As will be understood later, the arrangement 22 functions to block passage of oil and air past the ball bearings 16 and prevent the ball bearings 16, 18 from contacting each other.

The arrangement 22 is comprised of a rubber sealing ring 54 which surrounds a hardened, precision ground stainless steel bearing spacer ring 56 disposed around the shaft 26. The sealing ring 54 is reinforced along the length of its inner wall by a circular wire member 58 and has an outer wall diameter slightly larger than the diameter of the intermediate cavity step into which it is press fit. The spacer ring 56 has a height which is less than the height of the inner races 16a, 18a and outer races 16b, 18b of the ball bearings 16, 18, respectively. The height of the sealing ring 54 is also less than the height of the intermediate cavity so that lubricant is delivered to the lower ball bearings 18b via the oil inlets 48. The inner diameter of spacer ring 56 is stepped into a linear portion equal in diameter to the inner diameter of the inner race 16a of the upper set of ball bearings 16, and a radially diverging portion following the flaring wall 32 on the shaft 26. The outer diameter of the spacer ring 56 is smaller than the outer diameter of the inner races 16a, 18a of the upper and lower sets of ball bearings 16, 18. The hub 20 has a circular support surface 59 formed with a plurality of openings 60 for supporting an engine-driven drive pulley (not shown). The hub 20 has a depending pedestal 62 and a circular boss 64 through which a bore 66 is formed so that the hub 20 is press fitted to the top of the shaft 26 in spaced relation to the upper surfaces of the ball bearings 16 and the end cap 14.

To assemble the end cap assembly 10, sealing ring 54 is first pressed into the intermediate cavity in the end cap 14. Then, the upper ball bearings 16 are press fitted into the upper cavity of end cap 14 against shoulder 52. Following this step, the spacer ring 56 is pressed into the sealing ring 54 against the bottom of the ball bearings 16. Next, the lower ball bearings 18 are press fitted into the lower cavity of the end cap 14 against the shoulder 50, it being noted that the respective inner races 16a, 18a of the ball bearings 16, 18 are held separated by the spacer ring 56, and the outer races 16b, 18b are held separated by the internal structure of the end cap 14. With the crankshaft structure 12 placed in a fixture, the end cap 14 carrying the ball bearings 16, 18, the sealing ring 54 and the spacer ring 56 is press fitted onto the lower portion of shaft 26. Once this has been done, the hub 20 is press fitted to the top of the shaft 26 and the end cap assembly 14 is complete.

The end cap assembly 14 then forms a cartridge which is inserted into the air compressor housing (not shown) where the crankpin 28 is joined to a connecting rod secured to a piston which reciprocates in a cylinder as is well known. Fasteners (not shown) are passed through the holes 46 into mating holes in the air compressor housing which is tightly sealed against the base 38 using O-rings in the grooves 44. Finally, a drive pulley (not shown) is attached such as by fasteners screwed into holes 60 in the hub and is driven by a serpentine belt in driving relationship with the engine.

Using the end cap assembly 14 above described, the crankshaft structure 12 translates rotary driving power from the engine drive pulley into reciprocating movement of the piston and the compressor cylinder so as to deliver compressed air for mixture with fuel in the combustion chamber of the internal combustion engine. In the course of the air compressor operation, some pressurized air escapes past the rings on the compressor piston and moves into the compressor housing. In addition, lubricant being delivered by the engine's oil pump through oil inlets 48 must be localized to the bearings 18. Thus, it should be understood that the sealing ring 54 functions to block air and oil from passing along shaft past bearing 16. In addition, in contrast to prior art end cap assemblies wherein the upper and lower sets of ball bearings could be pressed against each other by human error during assembly, the present invention provides a precision ground spacer ring 56 inside the sealing ring 54 to ensure separation of the ball bearings 16, 18 at all times. The spacer ring 56 thus prevents preloading of the ball bearings 16, 18 so as to extend their lifetime. The combined seal and spacer arrangement 22 provides ease of assembly eliminating previous human error, and efficiently prevents the leakage of air and oil from the compressor at high speeds in the neighborhood of 6000 rpm.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

We claim:

1. In an end cap assembly, the assembly comprising:
a crankshaft structure having a shaft;

an end cap disposed around the shaft;

an upper set of ball bearings mounted in the end cap for disposition about the shaft;

a lower set of ball bearings mounted in the end cap and spaced below the upper set of ball bearings for disposition about the shaft; and a seal and spacer arrangement positioned about the shaft between the upper set of ball bearings and the lower set of ball bearings, wherein the seal and spacer arrangement comprises a cylindrical ring surrounded by a reinforced sealing member, wherein each of the upper and lower sets of ball bearings has a cylindrical inner race and a cylindrical outer race, the inner races of the upper and lower sets of ball bearings being separated by the seal and spacer arrangement, and the outer races of the upper and lower sets of ball bearings being separated by internal structure formed in the end cap.

2. The assembly of claim 1, wherein the outer diameter of the ring is smaller than the outer diameter of the inner race of the upper set of ball bearings.

3. The assembly of claim 2, wherein the height of the ring is less than the height of the inner races and the outer races of the upper and lower sets of ball bearings.

4. The assembly of claim 1, wherein the shaft has a radially flaring wall and an expanded portion having a height equal to the height of the inner race and the outer race of the lower set of ball bearings.

5. The assembly of claim 4, wherein the inner diameter of the ring is stepped in a linear portion equal to the inner diameter of the inner race of the upper set of ball bearings, and a diverging portion following the flaring wall of the shaft.

6. An end cap assembly having a crankshaft structure provided with a shaft, an end cap disposed around the shaft, a first set of ball bearings mounted in the end cap for disposition around the shaft and a second set of ball bearings mounted in the end cap and spaced from the first set of ball bearings for disposition around the shaft, the improvement comprising:

a crankshaft seal and bearing arrangement disposed around the shaft between the first and second sets of ball bearings for blocking passage of air and oil, and preventing the first and second sets of ball bearings from contacting each other, wherein the crankshaft seal and bearing spacer arrangement comprises a cylindrical stainless steel ring surrounded by a reinforced rubber seal.

7. An end cap assembly comprising:

a crankshaft structure having a shaft;

an end cap disposed around the shaft;

an upper set of ball bearings mounted in the end cap for disposition about the shaft;

a lower set of ball bearings mounted in the end cap and spaced below the upper set of ball bearings for disposition about the shaft; and a seal and spacer arrangement positioned about the shaft between the upper set of ball bearings and the lower set of ball bearings, the seal and spacer arrangement comprising a cylindrical ring and a sealing member, each of the upper and lower sets of ball bearings having a cylindrical inner race and a cylindrical outer race, the inner races of the upper and lower sets of ball bearings being separated by the seal and spacer arrangement, the outer races of the upper and lower sets of ball bearings being separated by internal structure formed in the end cap.

8. The assembly of claim 7, wherein the outer diameter of the ring is smaller than the outer diameter of the inner race of the upper set of ball bearings.

9. The assembly of claim 8, wherein the height of the ring is less than the height of the inner races and the outer races of the upper and lower sets of ball bearings.

10. The assembly of claim 7, wherein the shaft has a radially flaring wall and an expanded portion having a height equal to the height of the inner race and the outer race of the lower set of ball bearings.

11. The assembly of claim 10, wherein the inner diameter of the ring is stepped in a linear portion equal to the inner diameter of the inner race of the upper set of ball bearings, and a diverging portion following the flaring wall of the shaft.

* * * * *